INVENTORS.
ARTHUR A. ZUEHLKE
JAMES A.E. HYAMS
BY

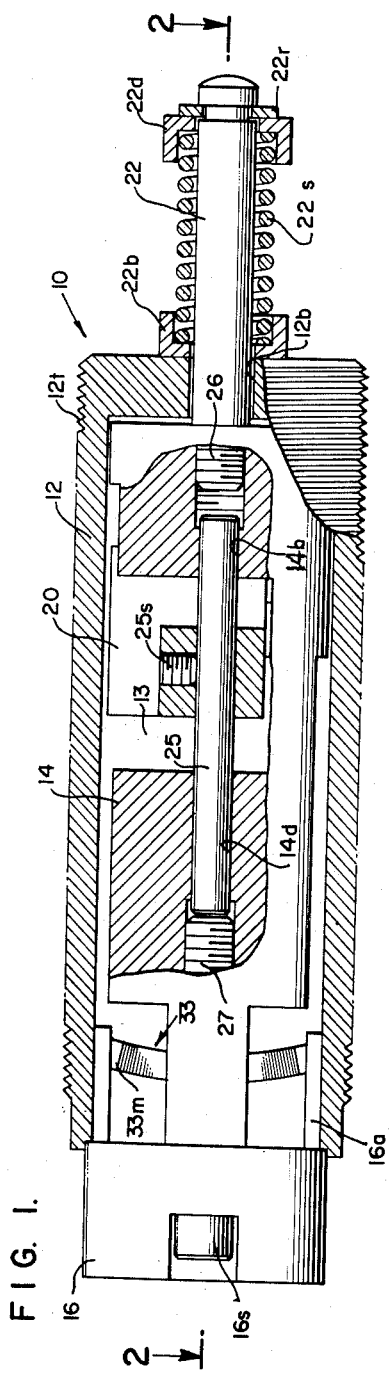
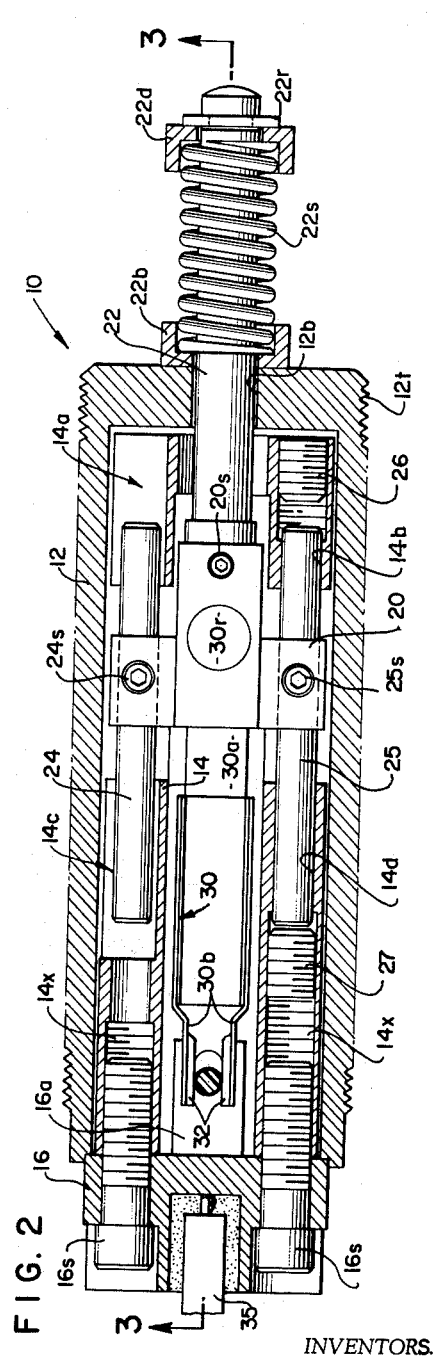
FIG. 1.
FIG. 2.
INVENTORS.
ARTHUR A. ZUEHLKE
JAMES A. E. HYAMS Feb. 6, 1962   A. A. ZUEHLKE ET AL   3,020,508
DISPLACEMENT TRANSDUCER
Filed Aug. 23, 1961   3 Sheets-Sheet 2
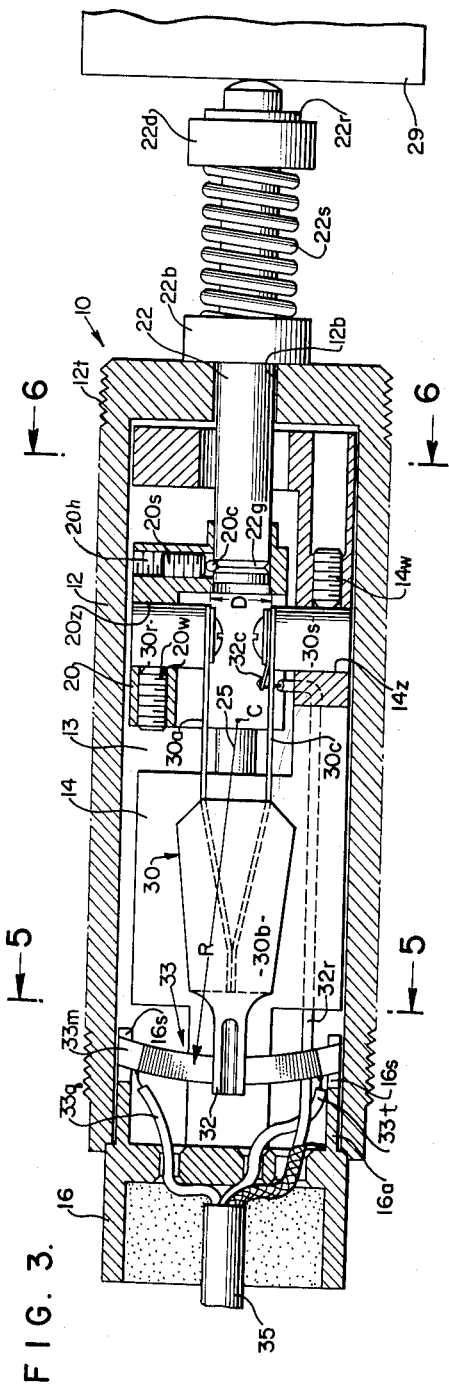
FIG. 3
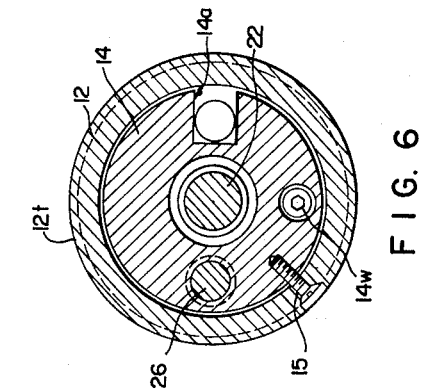
FIG. 6
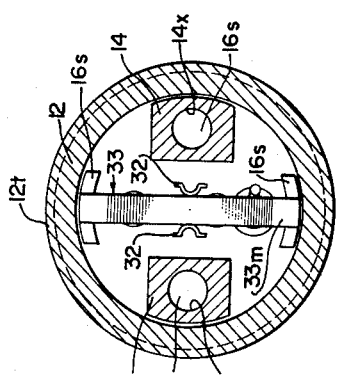
FIG. 5.
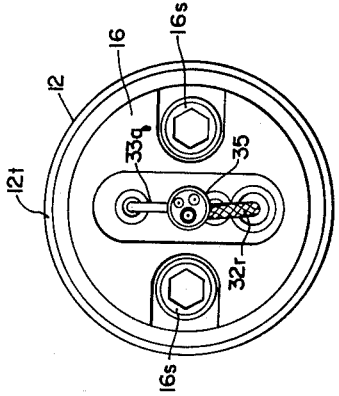
FIG. 4.
INVENTORS.
ARTHUR A. ZUEHLKE
JAMES AE. HYAMS
BY 

United States Patent Office 3,020,508
Patented Feb. 6, 1962

3,020,508
DISPLACEMENT TRANSDUCER
Arthur A. Zuehlke, Riverside, and James A. E. Hyams, Arlington, Calif., assignors to Bourns, Inc., a corporation
Filed Aug. 23, 1961, Ser. No. 133,517
16 Claims. (Cl. 338—162)

This invention pertains to improvements in motion or displacement-transducer instruments and more specifically to improvements in instruments for providing electrical indications mathematically related to and accurately indicative of, extents of translation or motions of bodies whose extents of motion may be very small relative to those of signaling or indicating devices required to produce the indications of the motions, or whose motions, although large, may require translation into much smaller extents of motion with or without introduction of a mathematical function into the motion, so that an electrical signaling means used therewith may be hermetically sealed against the ambient.

In many instances it is desirable to produce, with fine resolution, indications of the extent of any motion of a body or device within specified limits of such motion. No serious difficulty is ordinarily encountered in providing means for producing electrical indications of movements of a body if the indication need not be exactly linear or if the smallest movement to be measured or indicated is well within the resolving power of the indicating device or means, or if space-consuming auxiliary equipment may be used to perform an accurate electrical multiplication or amplification of the electrical indications. Great difficulty is experienced, however, in producing a very small instrument capable of accurately producing a wide range of electric signal output accurately related to motion of an actuator when the total range of the motion of the latter is only a very small fraction of an inch. For reasonable resolution in a directly-produced electric signal, a relatively large movement of one electric signal means relative to another is required, and that implies motion-amplification if the movement to be measured is very small. The amplification of motion without backlash or lost-motion, and with the requisite degree of accuracy and linearity, however, presents much difficulty. Since in the usual direct-acting electric signaling means, such as potentiometric means, linearity of the movement of the one signaling element relative to the other must be attained if expensive complications are to be avoided in producing the signaling elements, it is extremely desirable in the interest of simplicity of structure and accuracy and dependability of results to provide a simple, accurate, and reliable means for linearly amplifying the motions whose values or extents are to be indicated. Further, in those instances wherein relatively large motions are to be translated into electric signals in an environment unfavorable to the electric signaling elements or wherein it is desired to introduce a mathematically predetermined variation into the signal from that which would be produced if the motion-translation were truly linear, and in each of which cases it is desirable to have a very small instrument or transducer, it would be distinctly advantageous to make the electric means as small as practicable and seal them from the undesirable environment, transmitting a small-scale replica of the motion to be indicated through a hermetic seal and re-creating by amplification a larger-scale replica of the motion, for moving the electrical signaling devices, all without back-lash or lost motion or other source of inaccuracy.

The present invention, by utilizing a unique motion-amplifying means and/or by using a unique combination of other elements including electrical signaling elements, not only accomplishes the mentioned desirable results but additionally provides means for readily and accurately varying the ratio or extent of amplification of the motion to be electrically represented or signaled, whereby the instrument may be adapted to a larger range of specifications. For those accomplishments the invention uses as a motion-amplifying means a device comprising two spring members that are preferably but not necessarily identical and which extend away from a connecting member or bridge to which they are rigidly connected (preferably by being integral therewith), the two spring members preferably being leaf-springs and being preferably at least slightly divergent in the direction away from the connecting member or bridge. One leaf or limb of the device is at its free or unbridged end secured to a relatively fixed anchorage or base, and the free end of the other limb or leaf of the device is attached to the member whose movement is to be measured or indicated. The bridged end of the device supports the movable one of the two relatively movable electric signaling elements, the electric indication being made when one element moves relative to the other. The details of the structure and operation of the device, hereinafter termed a motion amplifier or multiplying device, will presently be fully set forth. In those instances in which it is desirable to exclude the ambient from access to the electrical signaling means, the member whose motion is to be indicated extends through and is sealed to a flexible means such as a diaphragm or bellows which in turn is sealed to a housing that contains the electric signaling elements and the motion multiplier. In those cases or constructions wherein it is desired to interpose a mathematical function, or to mathematically operate upon the motion to be indicated, the unanchored limb of the motion multiplier is secured to a cam follower that is actuated by a mathematically proportioned cam that is in turn moved, relative to the follower, by the member whose motion is to be operated upon and indicated by the electric signaling means.

The preceding brief description of the invention makes evident the fact that it is a principal object of the invention to provide improvements in means for providing accurate electrical indications of the respective extents of small motions of a member.

Another object of the invention is to provide means for greatly amplifying the extent of a motion whose extent is to be measured or indicated, with no lost motion.

Another object of the invention is to provide means for accurately amplifying a motion imparted to a member, while permitting adjustment of the ratio of motion amplification.

Another object of the invention is to provide means for producing with excellent resolution over a wide range of values, electrical signals representative of respective motions of a movable member within a range of motions of values from zero to a maximum.

Another object of the invention is to provide a very accurate simple device for directly translating very small variable motions of a member into respective electrical signals each accurately indicative of the extent of a corresponding movement of the member.

Another object of the invention is to provide a simple adjustable means for accurately multiplying extents of motion of a member without lost motion and at any selected value of multiplication within a determined range of values.

Another object of the invention is to provide means for reliably and accurately producing direct electrical indications of very small movements of a member in an environment unfavorable to the presence of electrical indicating means.

Other objects of the invention will hereinafter be made evident in the appended claims and in the description of a preferred principal embodiment, and modifications, of physical apparatus embodying principles of the invention. The exemplary apparatus is illustrated in the appended drawings comprising part of this disclosure, and in which drawings:

FIG. 1 is a plan view of an instrument embodying the invention, partly in section and with portions broken away to better illustrate details;

FIG. 2 is a view similar to FIG. 1, partly in section and with portions broken away, the view being as indicated by line 2—2 of FIG. 1;

FIG. 3 is a view similar to FIG. 1, partly in section, the view being generally as indicated by line 3—3 of FIG. 2;

FIG. 4 is an end view of the instrument;

Figure 7:
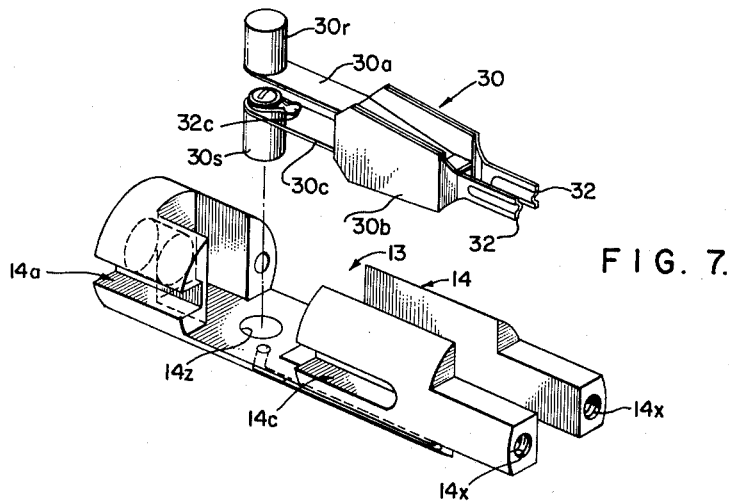
Figure 8:
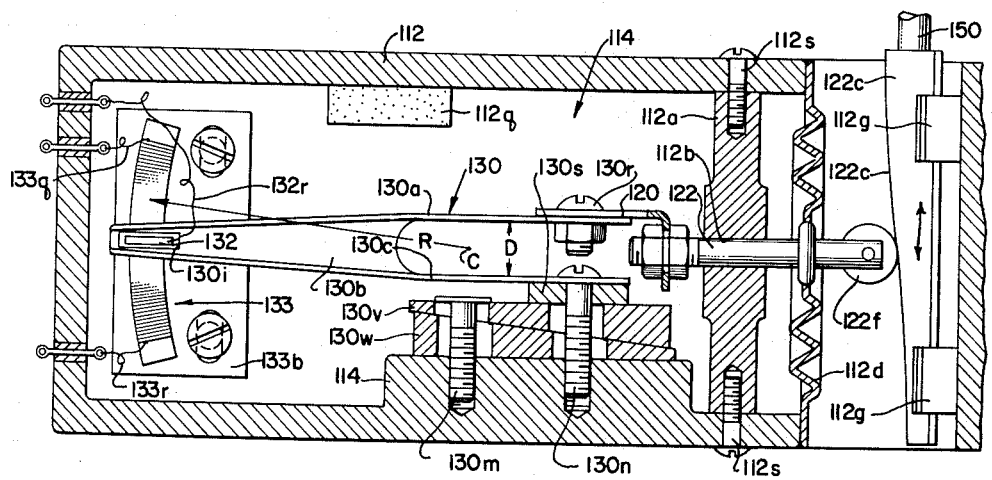
Figure 9:
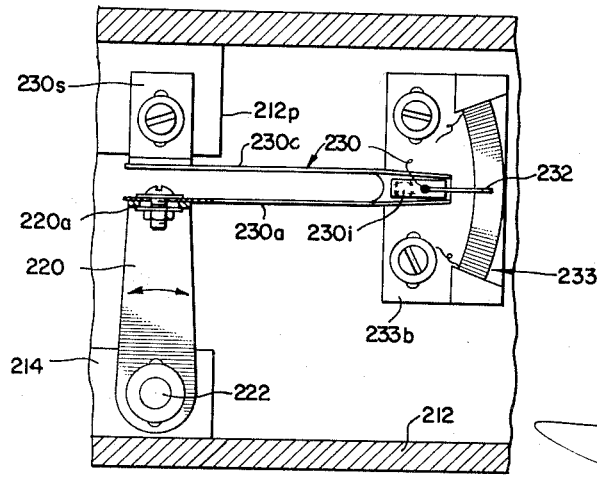

FIGS. 5 and 6 are transverse sectional views of the instrument, taken as indicated by lines 5—5 and 6—6, respectively, of FIG. 3;

FIG. 7 is a view of parts in disassembled relationship to show details of a frame and a motion-multiplier device;

FIG. 8 is a view, partly in section, of a modified form of instrument according to the invention; and FIG. 9 is a plan view of a modified arrangement of parts according to the invention.

Referring now to FIGS. 1, 2 and 3, an exemplary preferred form of displacement sensor or transducer according to the invention is indicated generally by ordinal 10. That instrument comprises casing and frame structures comprising a generally tubular case 12 which provides a cavity 13 in which operating parts are housed, and a shaped frame 14 (shown removed, in FIG. 7). Case 12 is provided along its exterior surface with a continuous screw-thread 12t, whereby the instrument may be adjustably mounted on or in equipment with which it is to be used. Frame 14 is fitted in case 12 and is secured rigidly in place therein by suitable means such as adhesive or screw means 15 (FIG. 6). A cap 16, formed to fit in a shallow counterbore in the open (left as shown) end of case 12, is adapted to close and seal that end of the case. The cap is secured in position by suitable means, such as by screws 16s that engage in tapped bores 14x provided in frame 14 (FIGS. 2 and 7).

Disposed in cavity 13 and arranged for limited movement therein is a slide 20 that forms a part of movable means whose displacements are to be sensed, multiplied, and indicated by signals by the instrument. Slide 20 is secured to a shaft or rod 22 that is journaled in and guided by a journal formed as a bore 12b in the end of case 12 as indicated. As shown in FIG. 3, rod 22 is provided at its inner end with a circumferential groove 22g for reception of a ball 20c that is firmly held in the groove by a screw 20s which is turned into a tapped home 20h provided in slide 20. By those means slide 20 and rod 22 may translate back and forth as a unit without lost-motion therebetween. As indicated in FIG. 2 slide 20 is restrained from motion other than along a prescribed path (rectilinear) by two guide rods 24, 25. Guide rod 24 is secured to the slide 20 by a set-screw 24s, and guide rod 25 is secured by a set screw 25s. Guide rod 24 is arranged to slide in longitudinally extending aligned and longitudinally spaced-apart slots 14a, 14c (FIGS. 2 and 7) formed in frame 14; and guide rod 25 is arranged to reciprocate in longitudinally-extending spaced-apart axially aligned bores 14b, 14d (FIGS. 1 and 2) formed in frame 14. The structure comprising guide rods 24, 15, the slide 20, and rod 22, is restricted in extent of longitudinal movement, by stop-screws 26 and 27 (FIGS. 1 and 2) that are adjustably positioned and held in tapped end portions of bores 14b and 14d, respectively, and which screws thus are positioned to be engaged by respective ends of guide rod 25 as the latter is translated with slide 20. Thus it is noted that slide 20 is movable in a prescribed limited path, the main body of the slide being disposed in a deep recess (FIG. 7) formed in frame 14.

Shaft 22 and slide 20 are stressed toward one extreme of travel (to the right as viewed in FIGS. 1, 2 and 3) by spring means comprising a spring 22s which is compressed between spring cups 22b and 22d which are mounted on rod 22. Spring cup 22d is prevented from escape by a retainer clip 22r that is held in a circumferential groove provided adjacent the exterior end of rod 22. As depicted, the rod 22 and slide 20 are in respective intermediate positions approximately half-way between extreme permissible positions, for purposes of improving the illustration of the device. However, it should be understood that when free to do so, spring 22s is effective to move the rod 22 to an extreme outward position. The rod 22 is arranged to be forced inwardly by a device or part (such as that shown in fragmentary form at 29 in FIG. 3) whose motions or displacements are under surveillance by the transducer.

Disposed generally in cavity 13 in the instrument case is a motion-multiplying device denoted generally by ordinal 30. Device 30 is provided to effect an amplification of the movements or displacements of the movable member means comprising rod 22 and slide 20, which movements may be of very small magnitude. The device 30 consists principally of first and second spring limbs 30a and 30c and means for firmly interconnecting the limbs together adjacent one end thereof. As shown, the resilient (spring) limbs 30a and 30c are bridged and rigidly interconnected by a bridge device 30b formed of a pair of plates to each of which the connected end portions of the spring limbs are secured by welding or other means. Also as shown, each of the non-connected end portions (hereafter termed free ends) of the spring limbs is secured, as by adhesive or by screws as indicated, to respective attachment means which in this case are cylindrical plugs 30r and 30s that are formed of insulative material. Plug 30r is held in adjusted position in a bore 20z formed in slide 20, by a set-screw 20w, in a manner indicated in FIG. 3. Plug 30s is held in adjusted position in a bore 14z formed in frame 14, by a set-screw 14w (FIG. 3). The adjustment is such that there is at least a slight divergence of the limbs 30a and 30c as viewed in a direction away from the bridge 30b. As a consequence of the described structural relationships, limb 30c, while free to flex or bend between bridge 30b and its anchorage or attachment at plug 30s, is nevertheless restrained from other movement by being secured to stationary plug 30s. Also, incident to translation or longitudinal displacement of rod 22 (and slide 20 and plug 30r which are thereto attached), the free or divergent end of limb 30a is translated and flexing occurs in both limbs between bridge 30b and the plugs. The result of the flexing of the limbs is a generally transverse swinging movement of bridge 30b, the direction of the swinging motion depending upon the direction of translation of the movable member means comprising rod 22.

As indicated in FIGS. 2 and 3, the upper and lower plates constituted in bridge 30b extend beyond the connected ends of limbs 30a and 30c, and are suitably shaped or formed to provide an electrical contact means 32 that constitutes the movable element of an electrical signaling means. In the illustrated embodiment of the invention the electric signaling means is a potentiometer whose resistance element is denoted generally by ordinal 33 (FIG. 3). Element 33 may be of any suitable type, but as depicted is of the type comprising a resistance wire winding on a curved anodized aluminum or ceramic mandrel 33m. Mandrel 33m is secured, as by adhesive, in appropriately disposed slots 16s provided in inwardly projecting arms 16a formed on or attached to cap 16. Insulated resistance-element terminal-leads 33q, 33t are connected to respective end portions of the resistance wire, and a contact lead 32r is connected to contact 32 by way of bridge 30b, limb 30c, and a terminal clip 32c that is secured with limb 30c to plug 30s. The three leads extend through sealed apertures in the base of cap 16 and form a cable termination 35 that is secured by sealing compound in cap 16 as indicated in FIG. 3.

The resistance element mandrel 33m is curved or arcuate in form, as best shown in FIG. 3, and is wiped along opposite contact surfaces by the opposed contacts 32 (FIG. 2) as the contacts are moved incident to flexing of limbs 30a and 30c when rod 22 is moved. It is evident that when rod 22 is translated outwardly (to the right as viewed in FIG. 2) limb 30a will be pulled to the right, placing limb 30c under compression, and that, since the two limbs are divergent toward the right as shown, both will flex upwardly. The upward flexing of the limbs moves bridge 30b upwardly and contacts 32 brush upwardly along element 33. Opposite (inward) movement of rod 22 similarly produces movement of contacts 32 in the opposite (downward) direction. Thus with a potential applied across leads 33t and 33q, the difference in potential between either of those leads and contact lead 32r is changed when rod 22 is moved, producing an electric signal that is evident at or between the terminal leads. The electrical signal represents, by the sign of the change and the magnitude thereof, the direction and extent of movement of rod 22.

The action of limbs 30a and 30c in flexing in response to reciprocatory movements of rod 22, is one of translation of the rectilinear motion of the rod into an amplified movement of bridge 30 in a substantially arcuate motion transverse to the direction of movement of the rod. As is evident from examination of FIG. 3, the arcuate or pivotal motion of the bridge 30b is about a slightly shifting center C located between the limbs 30a and 30c, and the extent of the amplification is dependent upon the ratio of the radius arm length and the distance between the attachment points of the limbs. Thus, assuming the center to be at point C, the radius arm for contacts 32 is R as indicated; and the distance between the limbs at anchorage is denoted by D. Then the amplification of the movement is proportional to $R/D$. It is evident then, that the ratio of multiplication of movement of rod 22 may be adjusted by varying the distance D, that is, by adjusting the position of plug 30s in bore 14z; and that the multiplication ratio can be as large as may be required by designing the device and instrument to have the requisite length of radius arm R.

It is evident that if it is desired to apply the transducer to service in an environment of high temperature, plugs 30r and 30s may be of metal and spring limbs 30a and 30c secured thereto by spot-welding, in which case contacts 32 should be mounted upon insulating ceramic pads carried by the plates of bridge 30b. This modification of the general structure will be presently described in greater detail.

The preceding description makes it evident that a movement of very small magnitude (within a range of movements of larger magnitude) of a movable member means such as rod 22 and slide 20, is by the transducer effectively amplified or multiplied to any desired extent without lost motion, and transduced or translated into an appropriate electric signal with excellent resolution. Also it is evident that the degree of amplification of the motion of the movable member or a driving member such as part 29, may be very finely adjusted by appropriate adjustment of either of plugs 30r and 30s inwardly or outwardly in its respective bore. Further it is evident that the relatively easily-damaged parts of the transducer, such as device 30 and the potentiometer elements, are protected from external matter or things by the casing 10 and from accidental or intentional excessive movement of the movable member means by the adjustable stopscrews 26 and 27.

In cases wherein the environment in which the instrument is to be employed is seriously adverse to proper functioning of the working parts of the transducer, those parts are hermetically sealed in the casing or housing. A modified structure adapted to use in such adverse environments is depicted in FIG. 8, with portions of the casing removed. In that drawing the sectional welded casing 112 provides a sealed chamber or cavity 114 in which a motion-multiplier device 130 is disposed with one resilient limb 130c thereof fixedly secured by attachment means to a frame 114 which may, as shown, be integral with part of the casing. The attachment means comprises a spacer 130s secured as by welding to the limb 130c, opposed wedges 130v and 130w, and anchor-screw means including screws 130m and 130n which screws are turned in tapped holes in frame 114. Thus the attachment means for limb 130c provides for adjustment of the ratio of amplification provided by device 130.

The other resilient limb 130a of device 130 is adjustably anchored by a bolt-and-slot connection, provided by a bolt-and-nut means 130r extending through an elongate hole or slot in limb 130, to a bracket 120 which is comprised in movable member means that include a rod 122 to the end of which the bracket 120 is secured as indicated. Resilient limbs 130a and 130c are bridged and rigidly interconnected adjacent their convergent ends by bridge means 130b, which in this construction is a web that is integral with the limbs. The terminal end of bridge means 130b supports an insulator insert 130i in a perforation formed therein, the insert being suitably secured to the web as by adhesive; and the insert insulates and supports an affixed contact 132 which forms one element of an electric signaling means here shown as a potentiometer. The other element of the signaling means is a resistance element 133 that is affixed to a base 133b which is adjustably secured to the base wall of the case 112 by means of screws as indicated. Insulated leads 133q, 133r and 132r extend from respective ones of the ends of element 133 and contact 132, to respective terminals sealed in the end-wall of case 112 as indicated.

The movable member means are arranged for to-and-fro displacements or movements, rod 122 being journaled or guided in and by a bore 112b provided in a interior of the case. To insure a good seal, screws 112s as indicated. Rod 122 is stressed, to the right as shown, by a resilient diaphragm 112d through which the rod extends and to which it is sealed by brazing. Diaphragm 112d is sealed around its periphery to the principal body of the case 112, and thus serves to hermetically seal the interior of the case. To insure a good seal, screws 112a are coated with sealing compound. Rod 22 is moved inwardly against the force applied by diaphragm 112d, by a cam-follower 122f which is in contact with a shaped surface of a cam 122c forming part of the movable member means. The active surface of the cam is formed according to a methematical function. The function may merely be one such as to correct for any slight non-linearity of signal produced by the potentiometer, or may be a function derived to perform a particular methametical operation upon movements of cam 122c, or other function as desired. The cam is guided in a guide 112g and is reciprocated in the direction of the double-pointed arrow by an actuator rod 150 that derives motion from a part under surveillance by the transducer. In those instances in which the case 112 is filled with a damping oil or fluid, to reduce or obviate adverse effects of vibration, compensation of expansion and contraction due to temperature changes and compensation of diaphragm movements is provided by means 112q affixed in the case 112. Means 112q may be a gas-filled bladder, or impervious foamed resin. Other features of construction and operation of the modified form of instrument may be evident from examination of FIG. 8, or evident from the explanation of the principal embodiment.

In the case of rocking motion, that is, to-and-fro motion of a shaft or rod about its longitudinal axis, the modified structure depicted in fragmentary form in FIG. 9 is used. Therein the rockshaft or rod 222 is journaled in a bore formed in a frame 214, which may be an integral part of a case 212. The rod 222 has secured thereto a rocker-arm 220 which is provided with an upturned end 220a. The instrument comprises a motion-multiplier device 230 comprising resilient limbs 230a and 230c, the former being attached at its free end to end 220a of the rocker arm by attachment means comprising screw means as indicated. The other limb, 230c, is secured at its free end, as by welding, to an adjustable bracket 230s that is in turn adjustably secured to a pedestal 212p formed as part of case 212, by screw means as indicated. The resilient limbs are interconnected adjacent their converging ends by a preferably integral bridge 30b, which bridge has riveted thereto an insulative plate 230i. Plate 230i has secured thereto a conductive contact 232 that is arranged to brush or wipe on a resistance element 233 that is mounted in an insulative adjustable base 233b. Base 233b is adjustably secured to the floor of case 212 by screw means as indicated.

It is evident that upon very slight angular rotation or rocking of shaft or rod 222, the attached free end of resilient limb 230a will be moved substantially longitudinally a short distance without lost motion, and that device 230 will amplify or multiply that movement and thereby move contact 232 a substantial distance along the surface of element 233. Also evident is the fact that due to the considerable increase or amplification of the movement there results a considerable improvement in resolution in the electric signal provided by potentiometer elements 232 and 233, relative to the resolution obtained without amplification of the motion.

It is evident that in the light of the present disclosure of a preferred form of exemplary apparatus according to the invention, changes and modifications will occur to those skilled in the art. Accordingly it is not desired to limit the invention to the exact details of the disclosed embodiment of apparatus, but we claim:

1. Displacement-indicating means comprising:
   a movable member whose displacements are to be indicated, and means for constraining the member to movements in a prescribed path;
   motion-multiplying means comprising first and second elongate spring members rigidly interconnected adjacent one end only of each thereof, the non-connected free end portions of the spring members being at least slightly divergent in a direction away from their interconnected ends;
   anchorage means relative to which said movable member is movable, and means firmly securing a free end portion of the first of said spring members to said anchorage means;
   means firmly securing a free end portion of the second of said spring members to said movable member for generally longitudinal movement in the direction of movement of the movable member;
   and motion-indicating means comprising a movable element secured to said motion-multiplying means adjacent the interconnected ends of said spring members,
   whereby movements of small magnitude of said movable member are translated by bowing flexure of said spring members into respectively concurrent motions of large magnitude of said movable element.

2. Displacement transducer means comprising:
   first means, comprising relatively fixed means including frame means, and a movable member constrained to movements in a predetermined path relative to said frame means;
   second means, including a device comprising first and second elongate spring means having respective free limbs with connecting means rigidly interconnecting the spring means adjacent one end thereof, and means securing the free end of the first of said limbs to said fixed means, and means securing the free end of the second of said limbs to said movable member; and
   third means, including a first transducing-element means supported by said device adjacent said connecting means, and a second transducing-element means supported by said fixed means in cooperative transducing relationship with said first transducing means, whereby incident upon occurrence of a relatively small movement of said movable member relative to said frame means the incident flexure of said elongate spring means causes a relatively large movement of said first transducing-element means relative to said second transducing-element means to improve the resolution of said first and second transducing-element means.

3. Displacement transducer means comprising:
   first means, comprising a device including first and second elongate divergent spaced-apart resilient limbs having relatively free first ends and means rigidly interconnecting the limbs at their second ends;
   second means, comprising relatively stationary means including frame means, and means securing the free end of the first of said resilient limbs to said stationary means;
   third means, comprising movable member means constrained by said relatively stationary means to movements in a prescribed path relative to said stationary means, and means securing the free end of the second of said resilient limbs to said movable member means; and
   fourth means, comprising electrical transducer means including a first relatively fixed transducer element and a second relatively movable transducer element arranged in cooperative relationship with said fixed element, and comprising means securing said relatively fixed transducer element to said stationary means and comprising means securing said relatively movable transducer element to said device adjacent the means rigidly interconnecting the limbs thereof, whereby relatively small movements of said movable member means are multiplied by said device by flexure of said resilient limbs to produce corresponding concurrent large movements of said second transducer element relative to said fixed transducer element to improve the resolution of said electrical transducer means.

4. Displacement-multiplying means adapted for multiplying displacements of a movable member without lost-motion, comprising:
   first means including first and second elongate spaced-apart resilient limbs having free ends and restricted ends, and divergent in a direction toward free ends thereof, and interconnecting means opposite the free ends of the limbs effectively forming a rigid interconnection between the limbs adjacent the restricted ends thereof, said first means comprising movable means at the free end of the first of said resilient limbs for imparting thereto in a direction generally toward the restricted end thereof displacements equal to those of said movable member in said direction;
   anchoring means at the free end of the second of said resilient limbs for anchoring the said free end in a fixed position;
   and means supported by said first means adjacent said interconnecting means arranged to have imparted thereto extensive substantially arcuate motion incident to relatively small displacement of the free end of said first resilient limb incident to motion of said movable means relative to said anchoring means.

5. Displacement-multiplying means according to claim 4, said first and second elongate spaced-apart resilient limbs each being in the form of flat spring limbs extending divergently away from said interconnecting means, and said interconnecting means including a web integral with said resilient limbs.

6. A displacement transducer adapted to amplify and translate relatively small displacements of a movable member into high-resolution electric signals, said transducer comprising:

first means, comprising casing and frame means;
second means, supported by said first means for movement relative thereto and including movable member means the displacements of which, relative to said first means, are to be amplified and translated;
third means, comprising a displacement-amplifying device including first and second flat resilient limbs each having first and second ends the second ends being spaced-apart and the limbs converging from said second ends toward said first ends and the limbs being rigidly interconnected adjacent their first ends by interconnecting means forming a part of said device, said third means comprising first attachment means securely attaching the second end of said first limb to said movable member means for movement therewith and comprising second attachment means securely attaching said second end of said second limb to said first means, whereby incident to displacement of said movable member means said second end of said first limb is generally longitudinally displaced and both said limbs are flexed and said interconnecting means is moved a distance at least several times the displacement of said movable member means; and
fourth means, comprising electric transducer means comprising a first transducer element supported by said first means and a second transducer element supported and moved by said displacement-amplifying device, said first and second transducer elements being cooperatively disposed and energized to provide electrical signals representing respective displacements of said movable member means.

7. A displacement transducer as defined by claim 6, said second attachment means being adjustable whereby the ratio of amplification effected by said device may be adjusted to a desired value.

8. A displacement transducer as defined by claim 6, said first attachment means being adjustable whereby the position of said second transducer element relative to said first transducer element may be adjusted.

9. A displacement transducer as defined by claim 6, said movable member means and said first means comprising cooperating stop means effective to limit the extent of displacements of said movable member means relative to said first means.

10. A transducer as claimed in claim 6, said first transducer element comprising a potentiometer contact and said second transducer comprising a potentiometer resistance element arranged to be wiped by said contact.

11. A displacement transducer as defined by claim 6, said first means comprising journal means and said movable member means comprising rod means journaled in said journal means, and cam follower means on said rod means;
and operable means including a cam having a cam surface defining a mathematical function of displacement of the cam and disposed in operating contact with said cam follower, said operable means comprising a member constructed and arranged to displace said cam relative to said cam follower,
whereby the electrical signals represent an amplified mathematical function of respective displacements of said cam.

12. A displacement transducer as defined by claim 6, said first means comprising journal means and said movable member means comprising a rod journaled in said journal means, and said movable member means comprising a rocker arm secured at one end to said rod and at another end secured to said second end of said first limb by said first attachment means.

13. A displacement transducer as defined by claim 6, said first means comprising journal means and said movable member means comprising a rod journaled in and constrained by said journal means.

14. A displacement transducer as defined by claim 13, said first means comprising casing means forming a cavity into which said rod extends and in which said device is disposed, and further comprising flexible means secured to said rod and constructed and arranged to seal said cavity against ingress of foreign material.

15. A displacement transducer as defined by claim 13, said movable member means comprising a slide means secured to said rod for movement therewith and to which slide means said first attachement means secures the second end of said first limb of said device.

16. A displacement transducer comprising:
first means, including a movable member displacements of which are to be transduced;
second means, comprising guided means, constructed and arranged for movement of the guided means by said first means incident to displacement of said movable member;
third means, comprising frame means, constructed and arranged to guide and constrain said guided means to to-and-fro displacements;
fourth means, comprising displacement-amplifying means consisting essentially of first and second leaf-spring limbs having respective first ends divergent and second ends convergent and bridge means rigidly interconnecting the second ends to move as a unit, and means connecting the first end of said first leaf-spring limb to have imparted thereto the to-and-fro displacements of said guided means, and means including said third means connected to the first end of said second leaf-spring limb to constrain that end against movement in the direction of the said to-and-fro displacements; and
fifth means, including means supported by said bridge means and moved therewith, for producing electrical indications of the bridge means as the latter moves through relatively large distances incident to relatively small displacements of said rod means.

References Cited in the file of this patent

UNITED STATES PATENTS 2,973,496     Gibbs _____ Feb. 28, 1961

FOREIGN PATENTS 862,491     Great Britain _____ Mar. 8, 1961

UNITED STATES PATENT OFFICE
CERTIFICATE OF CORRECTION

Patent No. 3,020,508                 February 6, 1962

Arthur A. Zuehlke et al.

It is hereby certified that error appears in the above numbered patent requiring correction and that the said Letters Patent should read as corrected below.

Column 3, line 67, for "15" read -- 25 --; column 5, line 10, strike out "is", second occurrence; column 6, line 42, strike out "interior of the case. To insure a good seal," and insert instead -- bulkhead 112a mounted in the case 112 by --; line 48, for "112a" read -- 112s --; line 54, for "methematical" read -- mathematical --; same column 6, line 57, for "methametical" read -- mathematical --.

Signed and sealed this 19th day of June 1962.

(SEAL)
Attest:

ERNEST W. SWIDER
Attesting Officer

DAVID L. LADD
Commissioner of Patents